United States Patent

[11] 3,576,584

[72] Inventors Ronald D. Cone;
Clarence A. Nelsen, Saratoga, Calif.
[21] Appl. No. 682,133
[22] Filed Nov. 13, 1967
[45] Patented Apr. 27, 1971
[73] Assignee Calma Company

[54] DIGITAL INCREMENTAL MAGNETIC TAPE RECORDER
7 Claims, 5 Drawing Figs.

[52] U.S. Cl. .......... 346/74, 340/174.1
[51] Int. Cl. .......... G01d 15/12, G11b 15/54
[50] Field of Search .......... 346/74 (M); 340/174.1 (A,B,G,)

[56] References Cited
UNITED STATES PATENTS

| | | | |
|---|---|---|---|
| 3,465,128 | 9/1969 | Poumakis et al. .......... | 340/174.1X |
| 3,099,822 | 7/1963 | Williams .......... | 340/174.1 |
| 3,332,084 | 7/1967 | Wahrer et al. .......... | 346/74 |

*Primary Examiner*—Bernard Konick
*Assistant Examiner*—Gary M. Hoffman
*Attorney*—Fowler, Knobbe & Martens

ABSTRACT: A recording medium is advanced an incremental distance by a stepper motor in response to a step command input. A displacement indicating means generates a write control signal to a recording means when the recording medium has been advanced a predetermined portion of the incremental distance. Data bit inputs to the recording means appearing as an input to the apparatus coincident with the step command will be recorded on the recording medium when the write control signal is generated.

INVENTORS.
CLARENCE A. NELSON
RONALD D. CONE
BY
FOWLER, KNOBBE
& MARTENS
ATTORNEYS.

INVENTORS.
CLARENCE A. NELSON
RONALD D. CONE
BY
FOWLER, KNOBBE
& MARTENS
ATTORNEYS.

INVENTORS.
CLARENCE A. NELSON
RONALD D. CONE
BY
FOWLER, KNOBBE
& MARTENS
ATTORNEYS.

DIGITAL INCREMENTAL MAGNETIC TAPE RECORDER

BACKGROUND OF THE INVENTION

1. Field of the Invention

This invention relates to digital incremental magnetic tape recorders and, more particularly, to an apparatus and a method for recording digital data at exact intervals on a magnetic medium and which allows the rate at which the magnetic medium is advanced from one position to another to be increased.

2. Description of the Prior Art

A digital incremental tape recorder generally includes motor driven tape supply and tape takeup reels. The tape path between the tape reels includes a plurality of write heads and a capstan drive driven by a stepper motor for advancing the tape in incremental steps between the reels. A source external to the tape recorder controls the incremental stepping of the tape and the writing of data thereon. The external source simultaneously generates a step command and a character digit input to the apparatus. The character digit comprises a plurality of data bits, each corresponding to a particular channel on the magnetic tape. When the tape recorder receives these data bit inputs, the particular write head for each data bit is energized, recording that bit upon the tape. At the same time, the step command energizes the stepper motor incrementing the magnetic tape to position it to receive the next character digit input.

The conventional digital incremental tape recorder is limited in operating speeds, characters per second and accuracy of character spacing by an inherent tendency of the step motor to "ring" when required to make short arc movements at high speeds. Instead of stopping precisely at the point at which the next character should be recorded, stepper motors in conventional recorders oscillate around the stopping point for a fraction of a second before coming to rest. If a data character is received by the tape recorder and recorded on the magnetic tape while the stepper motor is oscillating, it will be fractionally displaced on the tape within the limits of the oscillations. While this displacement is actually very small, a few ten-thousandths of an inch, it may be as large as 20 percent of the intended space between characters. Most major computer manufacturers which make the computer tape transports that must finally read the tapes produced by the incremental tape recorders specify a maximum acceptable character spacing variation of 2 percent. Accordingly, to attain the specified spacing variation, the operating speed of the incremental tape recorder must be reduced to allow the ringing of the stepper motor to damp out before another character input is applied. Typically, digital incremental tape recorders operate at 300 characters per second or less to achieve the maximum spacing variation of 2 percent. At stepping rates higher than 300 steps per second, the stepping motor may be at some unpredictable position when the character is written, resulting in an unacceptable spacing variation due to inertia overshoot or undershoot from the previous step.

SUMMARY OF THE INVENTION

The present invention provides a stepper motor operatively coupled to a recording medium for advancing the recording medium an incremental distance in response to a step command input from an external device. A displacement indicating means generates a write control signal after the recording medium has been advanced a predetermine portion of the incremental distance. The write control signal is an input to a recording means which also has a data bit input from the external device and will record the data bit on the recording medium when the write control signal and data signal are coincident.

An advantage enjoyed by the present invention is that the tape displacement directly controls the recording of data characters on the recording medium, insuring exact intervals between data characters on the tape. Since the stepper motor advances the recording medium as soon as the step command is received and the data is written on the recording medium only after the medium has been advanced a portion of the incremental distance, the oscillating of the stepper motor about its stopping position will not affect the character spacing on the recording medium and therefore allow higher incrementing rates.

In accordance with another aspect of the present invention, the recording medium displacement is indicated by a nonmagnetic annular disc having radial slots formed of a high permeability material at predetermined intervals around its periphery and is fixedly attached to the shaft of the stepper motor so that the angular rotation of the disc is proportionate to the linear displacement of the recording medium. A detecting means is provided which includes a means for generating a magnetic flux field through which the slots on the periphery of the annular disc rotate, resulting in a changing flux field as the stepper motor increments the recording medium. The detecting means also includes a pickoff means which is susceptible to the flux change when a slot in the disc passes through the magnetic field for generating an electrical pickoff output signal.

Another feature of the present invention is its provision of a pulse shaping means for preventing noise in the system from affecting the accuracy of the recording intervals. The pulse-shaping means is responsively coupled to the pickoff output signal and generates a write control pulse output whose leading edge is initiated when the pickoff signal exceeds a predetermined magnitude and whose trailing edge occurs when the pickoff signal becomes approximately zero. As a result, the write control pulse is only initiated when a significant change in the magnetic flux field occurs. Thus, lesser changes in the magnetic flux field due to noise are rejected and fail to produce an output from the pulse shaping means. In addition, the occurrence of the trailing edge of the write control pulse accurately determines the position of a slot in the annular disc within the magnetic flux field. As the high permeability material in the slot of the disc enters the magnetic field, the flux increases causing the electrical pickoff signal to be generated resulting in the initiation of the write control pulse. When the slot is exactly centered in the flux field, the flux reaches its maximum and the pickoff signal returns to zero causing the trailing edge of the write control pulse to occur.

DESCRIPTION OF THE PREFERRED EMBODIMENT

Figure 1:
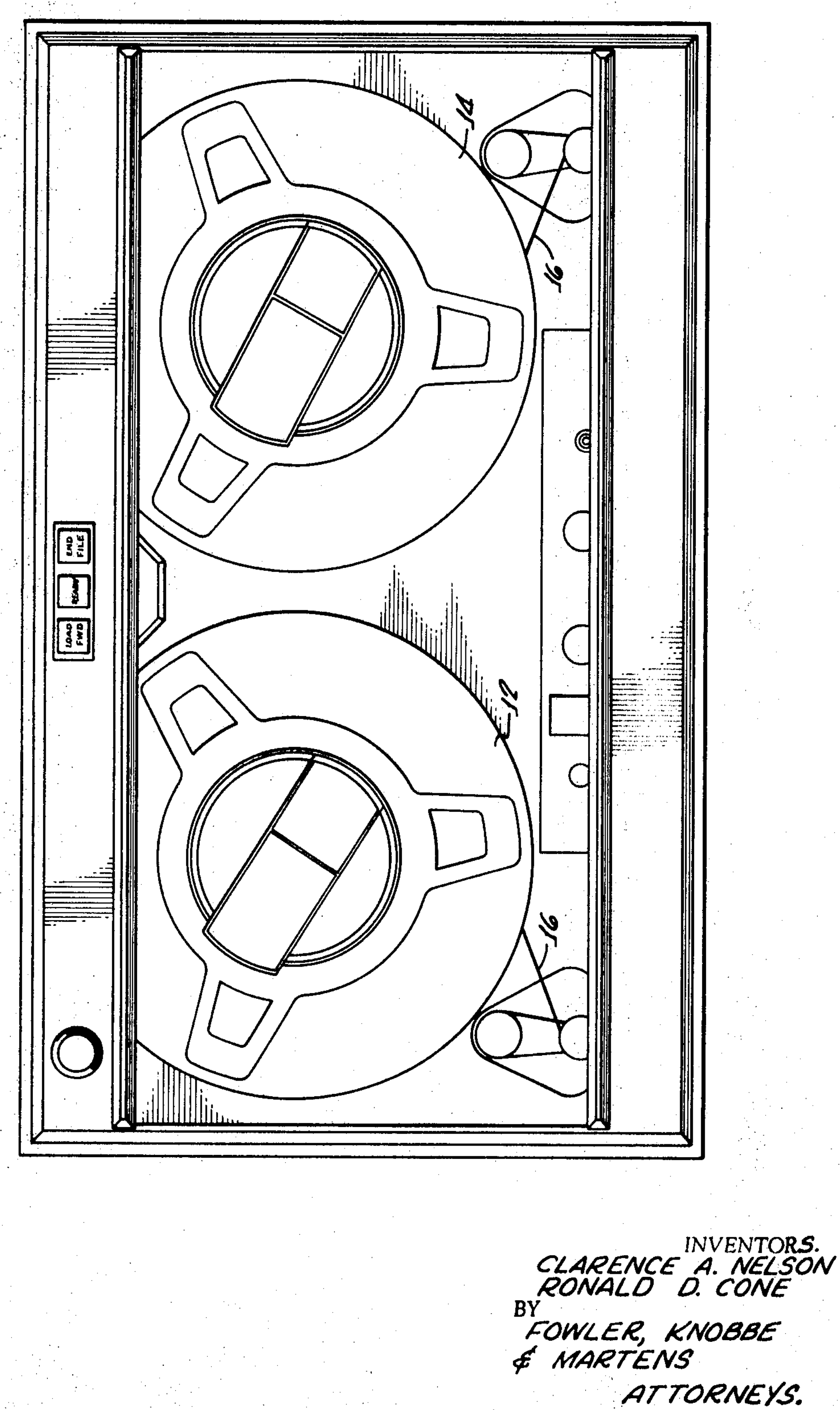
FIG. 1 is a front elevation view of a digital incremental magnetic tape recorder embodying the present invention.

FIG. 1 is a front elevation view of a digital incremental tape recorder embodying the present invention and includes a tape supply reel 12, a tape takeup reel 14 and a recording medium such as magnetic tape 16.

Figure 2:
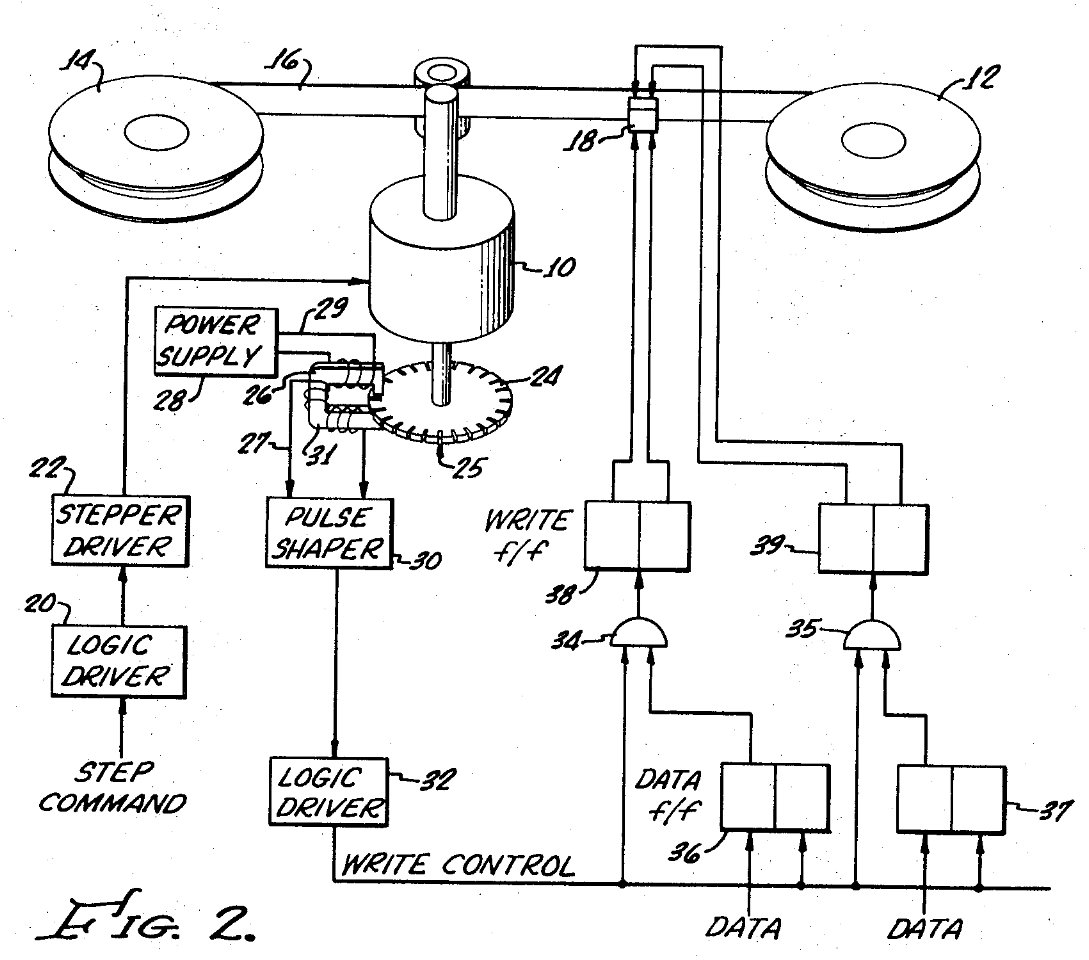
FIG. 2 is a system block diagram of the preferred embodiment of the present invention.

Referring to FIG. 2, there is shown a block diagram of the preferred embodiment of the present invention. A stepping motor 10 advances the magnetic tape 16 between the tape supply reel 12 and the tape takeup reel 14. A stepper motor drive means comprising logic driver 20 and stepper driver 22 is provided for advancing the stepper motor 10 in increments in response to a "step command" input to the tape recorder from an external source. Logic driver 20 provides a power gain stage for the "step command" input and has an output connected as an input to stepper driver 22. Stepper driver 22 is a conventional stepper motor driver circuit comprising, for example, a ring counter (not shown) which is advanced one count configuration for each input from logic driver 20. Also included in stepper driver 22 are three output amplifiers (not shown) which are interconnected with the ring counter so that for any particular count configuration, two of the output amplifiers will have an output to the stepper motor 10. Advantageously, stepper motor 10 is a variable reluctance three-phase step servomotor which may respond to stepping rate inputs of up to 900 pulses per second. The outputs of the three amplifiers contained in stepper driver 22 are connected to the three field windings of the stepper motor 10. As the outputs of the amplifiers from the driver 22 are cyclically energized, the stepper motor 10 will be incremented, advancing the recording medium 16 a predetermined distance between the tape reels 12 and 14.

Figure 4:
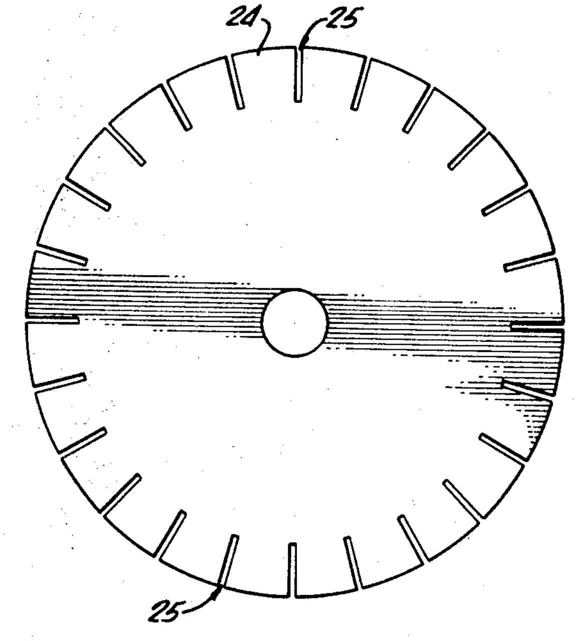
FIG. 4 is an enlarged plan view of the displacement indicating annular disc of FIG. 2.

A displacement indicating means co p comprising annular disc 24, pulse shaper 30 and detecting means 31 will cause a write control signal to be generated from pulse shaper 30 when the stepper motor 10 has advanced the recording medium 16 a predetermined portion of its incremental distance. As shown, annular disc 24 is fixedly attached to the shaft of stepper motor 10. Accordingly, each time the stepper motor 10 is incremented, the angular displacement of disc 24 is proportionate to the linear displacement of the recording medium 26. The annular disc 24 includes radial slots 25 located at predetermined intervals around its periphery as shown in FIG. 4. The interval between slots is determined by the amount of shaft rotation of the stepper motor 10 for each increment. In the preferred embodiment of the present invention, the shaft of stepper motor 10 will rotate 15° for each increment and therefore the slots 25 are spaced at 15° intervals. This limitation, which will be discussed hereinafter, is necessary to insure that for each increment of the stepper motor 10, only one slot will pass a reference point fixed with respect to the rotation of disc 24.

Advantageously, the disc 24 is formed of a material having a low magnetic permeability such as aluminum and the slots are filled with a material having a high magnetic permeability such as iron. The disc 24 could be constructed in the opposite manner, that is, having a body of high permeability and slots of low permeability. As a practical matter, however, the former method simplifies the design of the apparatus. For example, the use of an aluminum body for disc 24 keeps the inertia of the disc 24 low, thereby obviating any change in the dynamic characteristics of the stepper motor 10. By way of specific example, the disc 24 is advantageously of the order of one-half an inch in diameter and twenty one-thousandths of an inch thick with the radial slots 25 having a width of ten one-thousandths of an inch.

The slots 25 may be filled, for example, by placing the disc 24 between two sheets of plastic and injecting an iron epoxy from a hypodermic needle into the slots. The epoxy may then be worked into the slots where it sets up. The disc 24 is then lapped to remove any epoxy from its face.

Detecting means 31 includes a substantially square-shaped core 26 having a slot in one end through which the periphery of disc 24 rotates and a power supply 28 having output windings 29 wrapped around the core 26. Current passing through the windings 29 from the power supply 28 establishes a magnetic flux field between the open ends of the slot in the core 26. The position of the detecting means 31 is fixed with respect to the annular disc 24 and is such that the magnetic flux field through the gap in the core 26 is normal to the periphery of the disc 24. When the disc 24 rotates through the flux field, the flux is changed due to the difference in permeability between the disc 24 and the slots 25. It has been found advantageous to construct the core 26 so that the pole faces in the slot of the core 26 have substantially the same width as the width of the slots 25 in the annular disc 24. However, the pole face width may vary as much as 50 percent of the slot 25 width before the integrity of the system's operation is affected.

Detecting means 31 also includes a pickoff means comprising windings 27 about the core 26. A voltage will be induced in the windings 27 when the flux in the core 26 is changed by the rotation of annular disc 24 through the magnetic flux field. The electrical voltage induced into windings 27 is connected as an input to pulse shaper 30.

Figure 3:
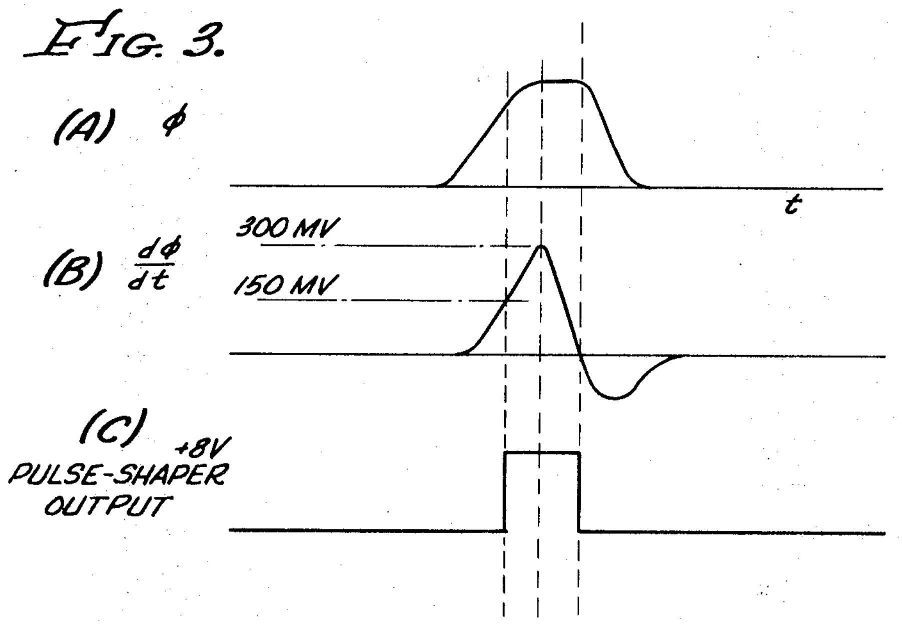
FIG. 3 is a diagram showing the phase relationship between the magnetic flux field, the induced pickoff voltage, and the square pulse output of the pulse shaping means.

Referring now to FIG. 3, there is shown the phase relationship between the magnetic field flux, seen in graph A, and the induced voltage in the pickoff windings 27, seen in graph B. The curve in graph A shows the flux of the magnetic field as the annular disc 24 rotates between the pole faces of the detecting means 31. The flux in the field begins to increase as the high permeability material in a slot 25 enters the slot in the core 26. The peak of the curve occurs when a slot on the disc 24 is aligned with the pole faces of the detecting means 31. The curve in graph B is the rate of change of the flux in the magnetic flux field with respect to time. It can be seen that the induced voltage in the pickoff windings, the curve of graph B, increases until the flux in graph A reaches a peak. The curve of graph B then returns to zero voltage when the flux in graph A is maximum and unchanging. When the slot in the annular disc 24 begins to leave the magnetic flux field decreasing the flux in graph A, a negative rate of change will occur in graph B. By way of specific example, the magnitude of the induced voltage in the pickoff windings is shown in graph B to be 300 millivolts.

The induced voltage in the pickoff winding 27 is an input to pulse shaper 30. The square pulse shown in graph C of FIG. 3 is the output of pulse shaper 30 and will be hereinafter referred to as the write control pulse. This write control pulse has a leading edge which can be seen to be initiated when the magnitude of the induced voltage in the pickoff windings 27 has reached a predetermined signal amplitude, e.g. 150 millivolts, and will be terminated when the induced voltage in the pickoff windings 27 has been reduced to approximately 0 volts. The trailing edge of the write control pulse then will occur when the flux between the pole faces of the detecting means 31 is a maximum, indicating that the slot in the annular disc 24 has been aligned between pole faces.

The voltage level output of the windings 27 at which the write control pulse is initiated is selectively determined to prevent noise in the flux field from initiating the write control pulse. Noise voltage pulses will occur in the windings 27 due to flux changes caused by variations in the output of the power supply 28. Another possible source of noise is any stray magnetic particles on the disc 24. For example, some of the high permeability iron epoxy used to fill the slots 25 may not be completely removed from the face of disc 24 during the lapping process and will result in a flux change in the field when it passes through the gap in core 26. By requiring the induced voltage in the windings 27 to exceed a minimum threshold before the write control pulse is initiated, these noise pulses may be successfully rejected.

It is significant that the write control pulse generated by the pulse shaper 30 is terminated when the voltage in the windings 27 passes through zero as shown. As will be discussed hereinafter, it is the trailing edge of the write control pulse that determines when data will be written on the recording medium 16. This allows the apparatus to accurately determine when the slot 25 is perfectly aligned with the pole faces of the gap in core 26. If, for example, the initiation or mere presence of the write control pulse were to control the recording of data, a great deal of recording accuracy would be lost. The flux pattern shown in graph A of FIG. 3 will vary for each individual slot in the disc 24 due to a fringing effect. That is, the flux in the magnetic field may begin to increase sooner for one slot than for another as they enter the field. Accordingly, the write control pulse will not be initiated for any one particular slot position within the field. However, the flux will reach a maximum and cause the induced voltage in the windings 27 to be reduced to zero only when a slot is exactly aligned with the pole faces in the gap of core 26.

The output of pulse shaper 30 is an input to logic driver 32 which provides a power gain stage to drive the remaining logic of the apparatus. The output of logic driver 32 is an input to a recording means comprising data flip-flops 36 and 37, dynamic AND gates 34 and 35, write flip-flops 38 and 39, and write head 18. Flip-flops 36 and 38 and gate 34 comprise one data channel. Flip-flops 37 and 39 and gate 35 comprise a second data channel. These data channels are only representative of a plurality of data channels in the apparatus, each of which provides a means for recording a data bit of a character digit input on the recording medium 16.

Data flip-flop 36 has a one-setting data input from a source external to the apparatus and a zero-setting input from the logic driver 32. The true output of flip-flop 36 is an input to dynamic AND gate 34. A second input to gate 34 is from logic driver 32. Gate 34 is enabled when the flip-flop 36 is true and will generate an output to write flip-flop 38 when the trailing edge of the write control pulse generated by the displacement indicating means occurs. The dynamic AND gates 34 and 35 are well known in the art and are not shown in detail. They include a capacitor which is charged when both inputs to the gate are true and which discharges when the voltage on one of its inputs has a negative going edge. The discharging of the capacitor is the output of the gate. The output of gate 34 is connected as a toggle input to flip-flop 38. Each time gate 34 generates an output, flip-flop 38 will change state. The true and false outputs from flip-flop 38 are connected to write head 18. Write head 18 will cause a data bit to be recorded on the recording medium 16 for each change of state of flip-flop 38.

When the trailing edge of the write control pulse from logic driver 32 occurs, the flip-flops 36 and 37 will be reset. This clears the flip-flops 36 and 37 of the data stored therein (which data has just been recorded) and readies them to receive new data bit inputs which will in turn be stored until the next write control pulse occurs.

The step command input to logic driver 20 and the data bit inputs to flip-flops 36 and 37 are generated by a source external to the present invention and are applied simultaneously. The plurality of data inputs to the recording means represents a character which is to be recorded on the recording medium 16.

In summary, a source external to the apparatus generates both a step command input to logic driver 20 and a plurality of data inputs representing a character to be recorded on the recording medium 16. The data inputs will set the data flip-flops 36 and 37 where the information is retained until recorded on the recording medium 16. The step command will cause the stepper motor 10 to increment, advancing the recording medium 16 a predetermined distance. When the recording medium 16 has been advanced a predetermined portion of its incremental distance, an induced voltage in the pickoff windings 27 in detecting means 31 will appear as an input to pulse shaper 30. A write control pulse will be generated by the pulse shaper 30 and applied as an input to gates 34 and 35, enabling the recording means to record the character on the recording medium 16.

As previously discussed, the spacing of the slots 25 around the periphery of disc 24 is determined by the angular rotation of the shaft of stepper motor 10 for each increment. This insures that only one write control pulse will be generated for each increment of the motor 10.

The disc 24 is attached to the shaft of the motor 10 so that at a rest position the pole faces of the slot in core 26 are at a point approximately midway between slots 25 in disc 24. Accordingly, when the motor 10 is incremented a slot 25 will appear in the flux field when the motor 10 is about half way through its incremental rotation. The position of the disc 24 on the shaft of motor 10 is located in this manner to obviate the possibility that multiple write control signals will be generated during one increment. Thus, if a slot 25 were located too near the flux field when the motor is in a rest position, the slot could enter the flux field several times as the motor 10 oscillates around its stopping point at the end of an increment and produce the unwanted multiple write control signals.

Figure 5:
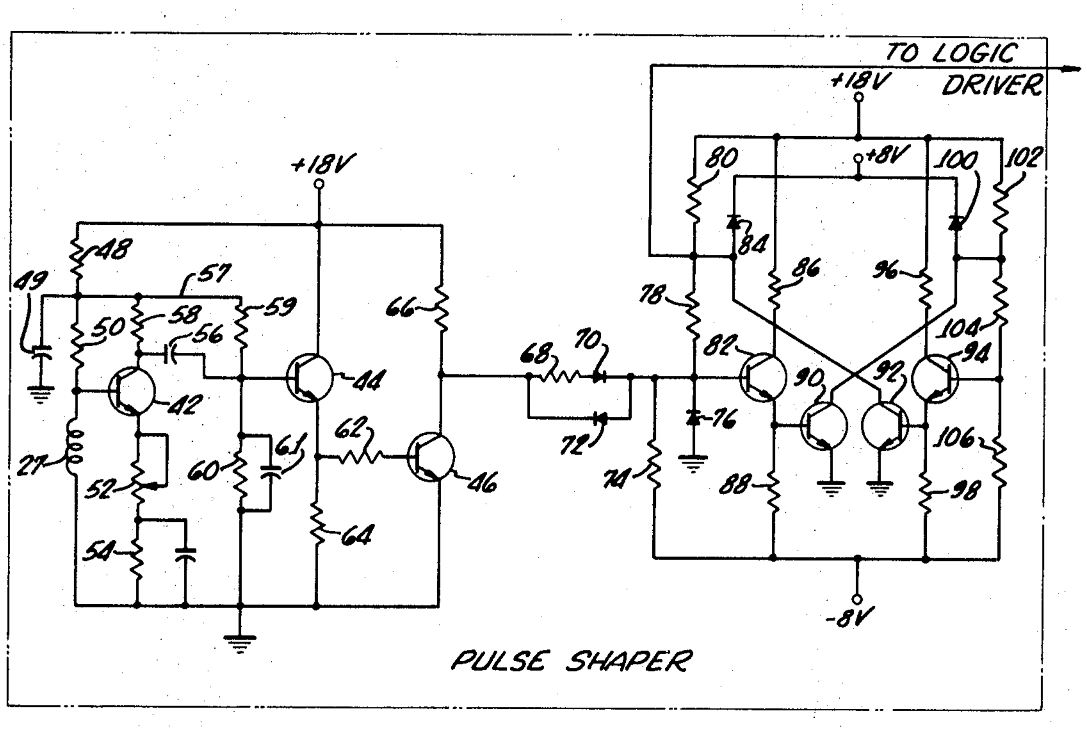
FIG. 5 is a schematic diagram of the circuitry of the pulse shaper shown in FIG. 2.

Referring now to FIG. 5, there is shown a schematic of the pulse shaper 30 comprising stage one which includes transistors 42, 44 and 46 and associated circuitry and stage two which includes transistors 82, 90, 92 and 94 and associated circuitry.

The input to the pulse shaper 30 is on the base of transistor 42. The pickoff winding 27 in the detecting means 31 is shown in the FIG. as having one side connected to ground and the other side connected to the base of transistor 42. Transistor 42 and its associated resistors 50, 52, 54 and 58 comprise an amplifier having an output, the collector of transistor 42, connected to the base of transistor 44 through capacitor 56. Capacitor 49 and resistor 48 form a filter to provide a constant voltage potential at node point 57. This voltage is connected to the base of transistor 44 through resistor 49 and then to ground through resistor 60. Resistors 59 and 60 divide the voltage appearing at node 57 so that the voltage on the base of transistor 44 will cause it to be conductive. The emitter of transistor 44 is connected to ground through resistor 64 and is also connected to the base of transistor 46 through resistor 62. The collector of transistor 44 is connected to +18 v. The emitter of transistor 46 is connected directly to ground and its collector is connected to + 18 v. through resistor 66. The collector potential of transistor 46 is the output of stage one.

The transistor 44 and resistor 64 form an emitter follower amplifier which amplifies the voltage appearing at the base of transistor 44 and controls the transistor 46. Transistor 46 is normally conducting. That is, when no voltage appears at the base of transistor 42 from the pickoff windings 27, transistor 46 will be conducting, resulting in the output of stage one being near ground potential. The values of the resistors in the circuit are selected so that when the predetermined potential of 150 millivolts appears at the base of transistor 42, due to the induced voltage in the pickoff windings 27, transistor 42 will become more conductive causing the potential on its collector to be lowered. This change in voltage level is AC coupled to the base of transistor 44 and will cause its base potential to be lowered making it less conductive. When transistor 44 becomes less conductive, its emitter potential is lowered, causing the transistor 46 to be shut off. The output of stage one will become approximately 18 v. when transistor 46 shuts off.

The output of stage one will remain at 18 v. until transistor 46 again becomes conducting which will occur when the pickoff voltage in winding 27 has been reduced to zero returning the circuit to its normal condition.

Stage one of the pulse shaper 30 thus generates a square-pulse output having a leading edge which occurs when the induced voltage in winding 27 exceeds a predetermined magnitude and a trailing edge occurring when the induced voltage passes through zero.

Capacitor 61 is connected between the base of transistor 44 and ground and provides a means of shunting to ground fast noise spikes appearing at the base of transistor 44. A transient flux change in the magnetic flux field will cause a voltage spike of short duration to be induced in the windings 27 and amplified by transistor 42. These noise spikes are transmitted to the base of transistor 44 through capacitor 56. The transistor 44, however, will not be affected since the value of capacitor 61 is selected so that they will pass to ground. Transistor 44 will be affected only by induced voltages in winding 27 which have a significant duration. The square pulse generated by stage one then is not only dependent upon the magnitude of the voltage induced in the windings 27 but also dependent upon time duration of the induced voltage.

The output of stage one of pulse shaper 30 is connected to stage two through resistor 68 and diode 70. Stage two is a modified bistable circuit which is normally in a first stable state. The circuit will be set to a second state when the input from stage one to the base of transistor 82 exceeds a particular magnitude. When the output of stage one returns to its normal condition, stage two will also reassume its normal state.

Transistors 92 and 94 are normally conducting. The base of transistor 94 is connected to +18 v. through resistors 102 and 104 and to −8 v. through resistor 106. A diode 100 is connected to +8 v. from between the resistors 102 and 104. This clamps the voltage potential between the resistors to +8 v. The values of resistors 104 and 106 are selected so that their voltage dividing action will cause the base of transistor 94 to be positive enough to maintain transistor 94 conductive. The collector of transistor 94 is connected to +18 v. through resistor 96 and its emitter is connected to −8 v. through resistor 98 and also to the base of transistor 92. When transistor 94 is conducting its emitter potential is positive, causing transistor 92 to conduct.

The emitter of transistor 92 is connected to ground and its collector is connected to +8 v. through diode 84. The collector of transistor 92 is also connected to +18 v. through resistor 80 and to the base of transistor 82 through resistor 78. When transistor 92 is conducting, the diode 84 is back-biased and the potential between resistors 80 and 78 is near ground. The potential between resistors 80 and 78 is the output of the pulse shaper 30 and is the input to logic driver 32.

Transistors 82 and 90 are normally not conducting. The base of transistor 82 is connected to −8 v. through resistor 74 and also to ground through diode 76. The resistors 78 and 74 divide the voltage from the point between resistors 78 and 80, which is ground, and the −8 v. so that transistor 82 is cut off. When the input to stage two from stage one increases to approximately 8 v., transistor 82 is turned on. The collector of transistor 82 is connected to +18 v. through resistor 86 and its emitter is connected to the base of transistor 90 and to −8 v. through resistor 88. When transistor 90 is conducting, the voltage at its emitter increases turning transistor 90 on. The emitter of transistor 90 is connected to ground and its collector is connected to a point between resistors 102 and 104. The point between resistors 102 and 104 will be lowered to ground potential when transistor 90 is conducting. Transistor 94 will accordingly turn off, also turning off transistor 92. With transistor 92 nonconductive, the ground is removed from between resistors 80 and 78 and the voltage at that point rises to +8 v. due to the +18 v. through resistor 80 and the clamping action of diode 84.

The output of stage two will remain at +8 v. until the input from stage one returns to approximately 0 volts.

By referring to FIG. 3, the relationship between the output of stage two of the pulse shaper 30, shown in graph C, and the input to stage one from the windings 27, shown in graph B, may be seen. The pulse shaper 30 output is normally zero until the induced voltage in winding 27 exceeds a predetermined minimum at which time the output becomes +8 v. due to the output of stage one, as previously discussed. The output of pulse shaper 30 then returns to zero when the voltage induced in winding 27 passes through zero.

We claim:

1. An incremental recorder for recording input digital data comprising:
- a stepper motor operatively coupled to a capstan for incrementally advancing a magnetic recording medium;
- means for detecting displacement of said magnetic recording medium through a predetermined distance, said means comprising:
  - i. an annular, very low inertia disc having spaced signal producing portions coupled to said stepper motor and rotating in accordance therewith, said annular disc having adjacent peripheral sections of substantially different magnetic permeabilities, and
  - ii. detecting means responsive to said signal producing portions to provide an output control signal responsive to a predetermined rotation of said disc, said detecting means including means for establishing a magnetic flux field normal to the periphery of said annular disc, rotation of said disc through said flux field causing said flux field to increase as a peripheral section of said disc having a high magnetic permeability enters said flux field, said flux field being a maximum when said high magnetic permeability peripheral section reaches a predetermined location within said flux field, said detecting means also including a pickoff means susceptible to the rate of change of flux in said magnetic flux field for generating said output signal having an increasing amplitude as said flux increases and returning to zero when said flux reaches a maximum, said return to zero of said output signal being coincident with said disc reaching a predetermined location within said flux field;
- means coupled to said output signal for providing a write control signal substantially insensitive to noise and coincident with a predetermined spatial alignment of a signal producing portion of said disc and said detecting means; and
- recording means coupled to said input digital data and responsive to said output control signal for recording said data on said recording medium when said medium has been displaced through said predetermined distance.

2. The incremental recorder described in claim 1 wherein said means coupled to said output signal for providing a write control signal generates the leading edge of said write control signal when the amplitude of said output signal exceeds a predetermined minimum and causes the trailing edge to occur when said output signal exceeds a predetermined minimum and causes the trailing edge to occur when said output signal returns to zero, said trailing edge of said write control signal being coincident with said high magnetic permeability peripheral section of said disc reaching a predetermined location with said flux field and wherein said recording means records data on said recording medium when said trailing edge of said write control signal occurs.

3. The incremental recorder described in claim 1 wherein said annular disc is coupled to said stepper motor so that a high magnetic permeability section of said disc will reach said predetermined location in said flux field when said stepper motor has completed a predetermined portion of its incremental movement.

4. An apparatus having applied step command and input data for recording said data at precise intervals on a recording medium advanced in response to said step command comprising:
- means operatively coupled to said recording medium and having said step command as an input for advancing said recording medium an incremental distance in response to said step command;
- displacement indicating means for generating a write control signal output after said recording medium has been advanced a predetermined distance, said displacement indicating means comprising:
  - i. an annular disc fixedly attached to the shaft of said means operatively coupled to said recording medium having an angular displacement proportionate to the linear displacement of said recording medium and also having adjacent peripheral sections of different magnetic permeability, and
  - ii. detecting means having a fixed position adjacent said disc and responsive to the differences in magnetic permeability between peripheral sections of said disc for generating an electrical output signal when said disc rotates through a predetermined angle, said detecting means comprising:
    - a. means for generating a magnetic flux field normal to said disc at a point proximate its periphery, rotation of said disc resulting in said peripheral sections of said disc passing through said field changing said flux; and
    - b. pickoff means susceptible to said flux change for generating an electrical pickoff signal increasing to a maximum as a peripheral section of high magnetic permeability enters said flux field and returning to zero as said peripheral section reaches a predetermined location within said flux field; and recording means having said input data and said write control signal as an input for recording said data on said recording medium when said write control signal is generated.

5. The apparatus of claim 4 wherein said detecting means further includes a pulse shaping means having said electrical pickoff signal as an input and generating a pulse output having a leading edge which is initiated when said pickoff signal exceeds a predetermined magnitude and having a trailing edge occurring when said pickoff signal becomes approximately zero.

6. The apparatus of claim 5 wherein said electrical output signal returns to zero from a maximum when said disc rotates through an angle proportionate to said recording medium advancing a predetermined portion of its incremental distance.

7. The apparatus of claim 5 wherein said recording means comprises:

a coincidence gate having as an input said pulse and said input data, said gate generating an output when said trailing edge of said pulse occurs if a signal is present on said data input;

a toggle flip-flop having the output generated by said coincidence gate connected as a toggle input such that the flip-flop will change state for each toggle input received; and, a recording head adjacent said recording medium having the output of said toggle flip-flop as an input for recording a data bit on said recording medium each time said toggle flip-flop changes state.

PO-1050
(5/69)

UNITED STATES PATENT OFFICE
CERTIFICATE OF CORRECTION

Patent No. 3,576,584 Dated April 27, 1971

Inventor(s) Ronald D. Cone et al

It is certified that error appears in the above-identified patent and that said Letters Patent are hereby corrected as shown below:

Col. 1, line 66, "predetermine" should be --predetermined--
Col. 3, line 18, delete "co p"; line 50, "twenty one-thousandths" should be --twenty thousandths--
lines 51 and 52, "ten one-thousandths" should --ten thousandths--.

Signed and sealed this 21st day of September 1971.

(SEAL)
Attest:

EDWARD M.FLETCHER,JR.
Attesting Officer

ROBERT GOTTSCHALK
Acting Commissioner of Pate